(12) United States Patent
Ho et al.

(10) Patent No.: US 11,812,765 B2
(45) Date of Patent: Nov. 14, 2023

(54) SUPERVISORY MACHINE INTELLIGENCE CONTROLS FOR PRODUCTION OF MEAT SUBSTITUTES

(71) Applicants: ABB Schweiz AG, Baden (CH); Planted Foods AG, Kemptthal (CH); ETH Zürich, Zürich (CH)

(72) Inventors: Chau-Hon Ho, Lörrach (DE); Vedrana Spudic, Zürich (CH); Kim Listmann, Darmstadt (DE); Sandro Schoenborn, Basel (CH); Elsi-Mari Borrelli, Wettingen (CH); Philipp Sommer, Zürich (CH); Mehmet Mercangoez, Stein (CH); Erich J. Windhab, Hemishofen (CH); Eric Stirnemann, Zürich (CH); Lukas Böni, Zürich (CH); Patrick Rühs, Zürich (CH)

(73) Assignees: ABB Schweiz AG, Baden (CH); Planted Foods AG, Kemptthal (CH); ETH Zürich, Zürich (CH)

( * ) Notice: Subject to any disclaimer, the term of this patent is extended or adjusted under 35 U.S.C. 154(b) by 0 days.

(21) Appl. No.: 18/005,840

(22) PCT Filed: Jun. 22, 2021

(86) PCT No.: PCT/EP2021/066987
§ 371 (c)(1),
(2) Date: Jan. 17, 2023

(87) PCT Pub. No.: WO2022/012879
PCT Pub. Date: Jan. 20, 2022

(65) Prior Publication Data
US 2023/0225363 A1    Jul. 20, 2023

(30) Foreign Application Priority Data

Jul. 17, 2020 (EP) .................................. 20186396

(51) Int. Cl.
*A23J 3/26* (2006.01)
*A23P 30/20* (2016.01)
*A23J 3/22* (2006.01)

(52) U.S. Cl.
CPC .............. *A23J 3/26* (2013.01); *A23J 3/227* (2013.01); *A23P 30/20* (2016.08)

(58) Field of Classification Search
CPC .............. A23J 3/26; A23J 3/227; A23P 30/20
USPC ....................................................... 426/231
See application file for complete search history.

(56) References Cited

U.S. PATENT DOCUMENTS

2005/0214419 A1   9/2005   Aberle et al.

FOREIGN PATENT DOCUMENTS

| JP | 50049462 A | 5/1975 | |
|---|---|---|---|
| JP | S5049462 A | 5/1975 | |
| JP | 32062471 A | 11/1991 | |
| KR | 1020160068733 A | 6/2016 | |
| WO | 9636242 A1 | 11/1996 | |
| WO | 2009076136 A1 | 6/2009 | |
| WO | 2009143840 A2 | 12/2009 | |
| WO | 2015020873 A1 | 2/2015 | |
| WO | 2016142788 A2 | 9/2016 | |
| WO | WO-2016142788 A2 * | 9/2016 | ................ A23J 3/14 |

OTHER PUBLICATIONS

JP-62074264—Machine Translaiton (Year: 1987).*
Extended European Search Report; Application No. 20186396.6; Completed: Dec. 3, 2020; dated Dec. 14, 2020; 5 Pages.
International Search Report and Written Opinion of the International Searching Authority; Application No. PCT/EP2021/066987; Completed: Sep. 6, 2021; dated Sep. 22, 2021; 13 Pages.

* cited by examiner

*Primary Examiner* — Hamid R Badr
(74) *Attorney, Agent, or Firm* — WHITMYER IP GROUP LLC

(57) ABSTRACT

A system includes a wet extrusion process machine configured to receive, mix, and convey a plurality of ingredients to an extrusion die, the plurality of ingredients include a protein powder, an oil, and water. The system includes an electronic process control system (EPCS) configured to control the wet extrusion machine using a plurality of process settings effective to produce an extrusion die mixture which is forced into, passes through, and is output from the extrusion die. The system further includes a supervisory machine intelligence control system (SMICS) operatively coupled with at least one of a direct fibrosity measurement (DFM) subsystem configured to directly measure one or more physical fibrosity parameters of the extrusion die mixture, and an indirect fibrosity measurement (IFM) subsystem configured to measure one or more extrusion process parameters associated with the extrusion die mixture. The SMICS is configured to modify one or more of the plurality process settings in response to at least one of the one or more physical fibrosity parameters, and the one or more extrusion process parameters, effective to modify the extrusion die mixture.

15 Claims, 5 Drawing Sheets

SUPERVISORY MACHINE INTELLIGENCE CONTROLS FOR PRODUCTION OF MEAT SUBSTITUTES

TECHNICAL FIELD

The present application relates to apparatuses, methods, and systems for the production of alternative protein-based meat substitutes and to supervisory machine intelligence controls for such apparatuses, methods, and systems.

BACKGROUND

Human population growth and socio-demographic changes are placing increased pressure on natural resources to provide more and different types of food. Proteins are one of the key nutrients for the human diet. Animal-based proteins from meat are an increasingly popular and important source of protein for the human diet, however, the ecological impact of animal farming and meat production is also a significant and growing problem. Alternative protein-based meat substitutes, such as plant protein-based meat substitutes and insect protein-based meat substitutes, offer an alternative food source that seeks to provide or exceed the nutritional benefits of meat.

A significant challenge for alternative protein-based meat substitutes is providing desired aesthetic and physical characteristics (for example, taste, texture, toughness, appearance, and cooking behavior, which are both aesthetic and physical characteristics) that emulate or exceed those of animal-based meat. Controlling the aesthetic characteristics of alternative protein-based meat substitutes is a complex problem impacted by multiple variables including ingredient characteristics (for example, the chemical composition, physical composition and structure, purity, and other characteristics of the ingredients and additives introduced into the process) and process settings (for example, ingredient feed rate, process flow rates, process temperatures, and other control parameters).

FIG. 1 is a schematic diagram depicting certain aspects of a prior art system 100 for producing an alternative protein-based meat substitute product. In system 100, one or more human operator(s) 102 generates a recipe 104 including ingredients 106 to be provided to a wet extrusion process machine 112 and process settings 110 which are provided to a machine controller 103 configured to control the operation of the wet extrusion process machine 112. The wet extrusion process machine 112 includes one or more feeders 114 which supply one or more respective ingredients 106 to an extruder 108 which includes one or more rotating screws 116 which are disposed and rotatable within a stationary barrel or chamber 118 defining a length of a processing path.

The ingredients 106 may include, for example, one or more alternative protein powders (for example, plant-based flours and/or insect-based flours), water, and oil, and may also include additives, fillers, processing aids, and the like. The one or more feeders 114 introduce the ingredients 106 into the extruder 108 at various locations along the length of the processing path. The extruder 108 mixes and advances the ingredients 106 along the length of the processing path, controls the temperature at different locations along the length of the processing path, and extrudes a processed mixture through a die 120. The extruded processed mixture may then undergo one or more post-processing operations 124 to configure the processed mixture output from die 120 into the final form of a meat substitute product 126.

The process settings 110 may include quantities or rates of introduction of the ingredients 106, rotation speed of the one or more screws 116, temperature, pressure, and/or humidity settings at one or more locations along the length of the processing path, and other operational settings of wet extrusion process machine 112. The system 100 relies on adjustment input 122 from the one or more human operator(s) 102 to adjust the ingredients 106, processing settings 110, and post-processing operations 124. Adjustment input 122 is based on the operator(s) inspection and evaluation of a product under process at one or more points in the process (for example, product samples taken from the output of die 120 or at one or more points in post-processing operations 124) in order to achieve the desired characteristics of the meat substitute product 126 and therefore depends on the operator(s) expertise and experience.

Heretofore, achieving desired aesthetic characteristics for alternative protein-based meat substitutes has required reliance on human expertise and experience achieved through costly trial-and-error repetition. This imposes several disadvantages and limitations. For example, because achieving the desired aesthetic characteristics depends on the experience of individual human experts, production is exposed to the risk of the experts' unavailability. Additionally, while machine intelligence control techniques are known to be useful in some contexts, they are highly process-specific and have not been developed to the point of general applicability to process control. Furthermore, such techniques have proven inefficient or ineffective in a number of applications. Even using general forms of such techniques, adapting a process towards optimized and customized food products is a time-consuming proposition and may require weeks and months of trial and error-based experiments, with limited changes for and degrees of success. Lack of relevant information on key parameters has been another obstacle to both human expert control and machine intelligence control approaches. A further confounding variable is the presence of compositional complexity such as non-Newtonian and nonlinear fluid behaviors which are exhibited by alternative protein-based meat substitute product materials. Unknown variation in ingredient inputs is a yet another confounding hindrance. There remains a significant unmet need for the unique apparatuses, methods, systems, and techniques disclosed herein.

SUMMARY

To address the foregoing and other shortcomings and problems faced in the art, the inventors have developed a number of unique technical solutions including the apparatuses, methods, systems, processes, and techniques disclosed herein. For the purposes of illustrating certain aspects of the same, reference shall now be made to the example embodiments illustrated in the accompanying drawings of the present disclosure.

DETAILED DESCRIPTION

Figure 1:
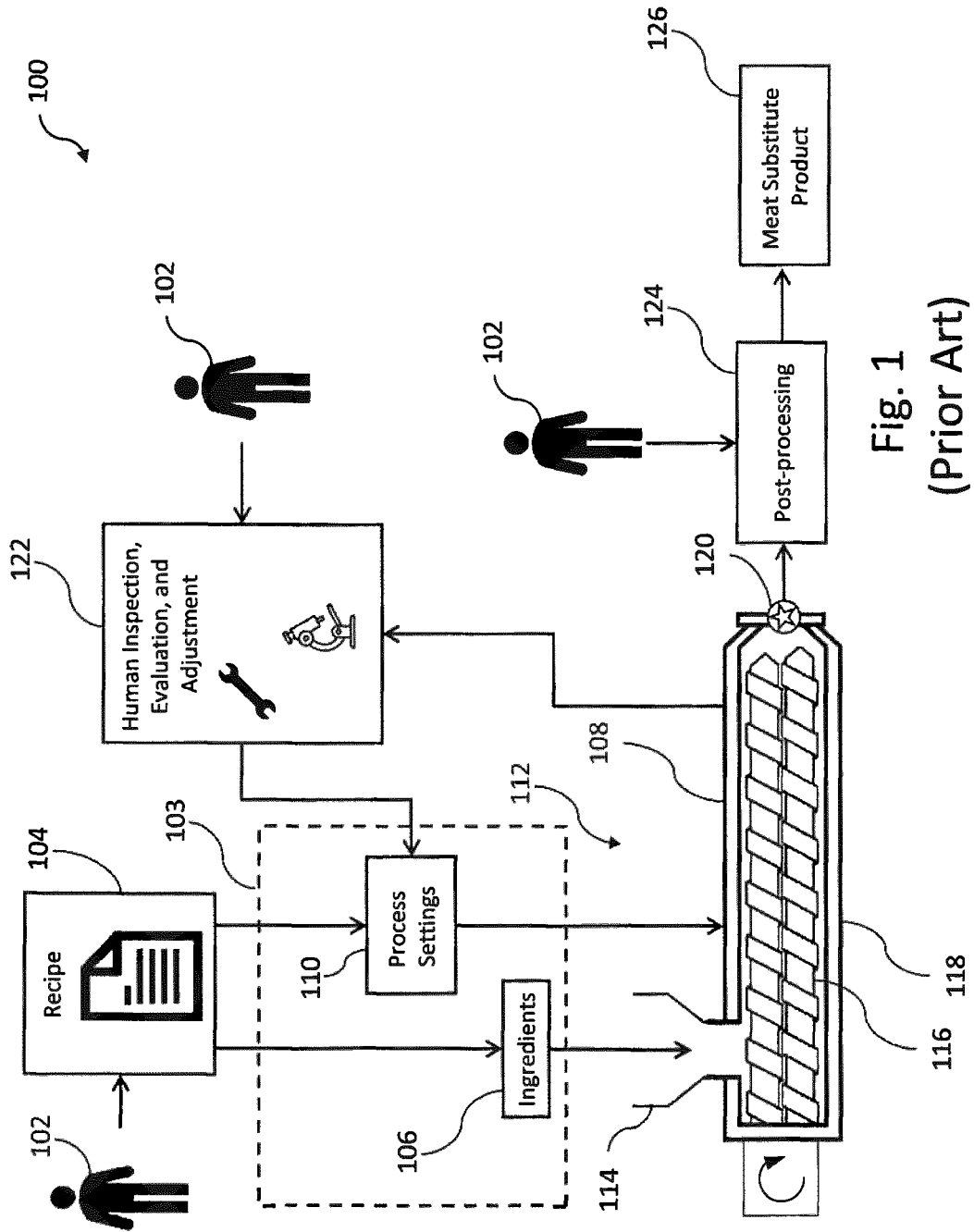
FIG. 1 is a schematic diagram illustrating a prior art system for producing alternative protein-based meat substitutes.
Figure 2:
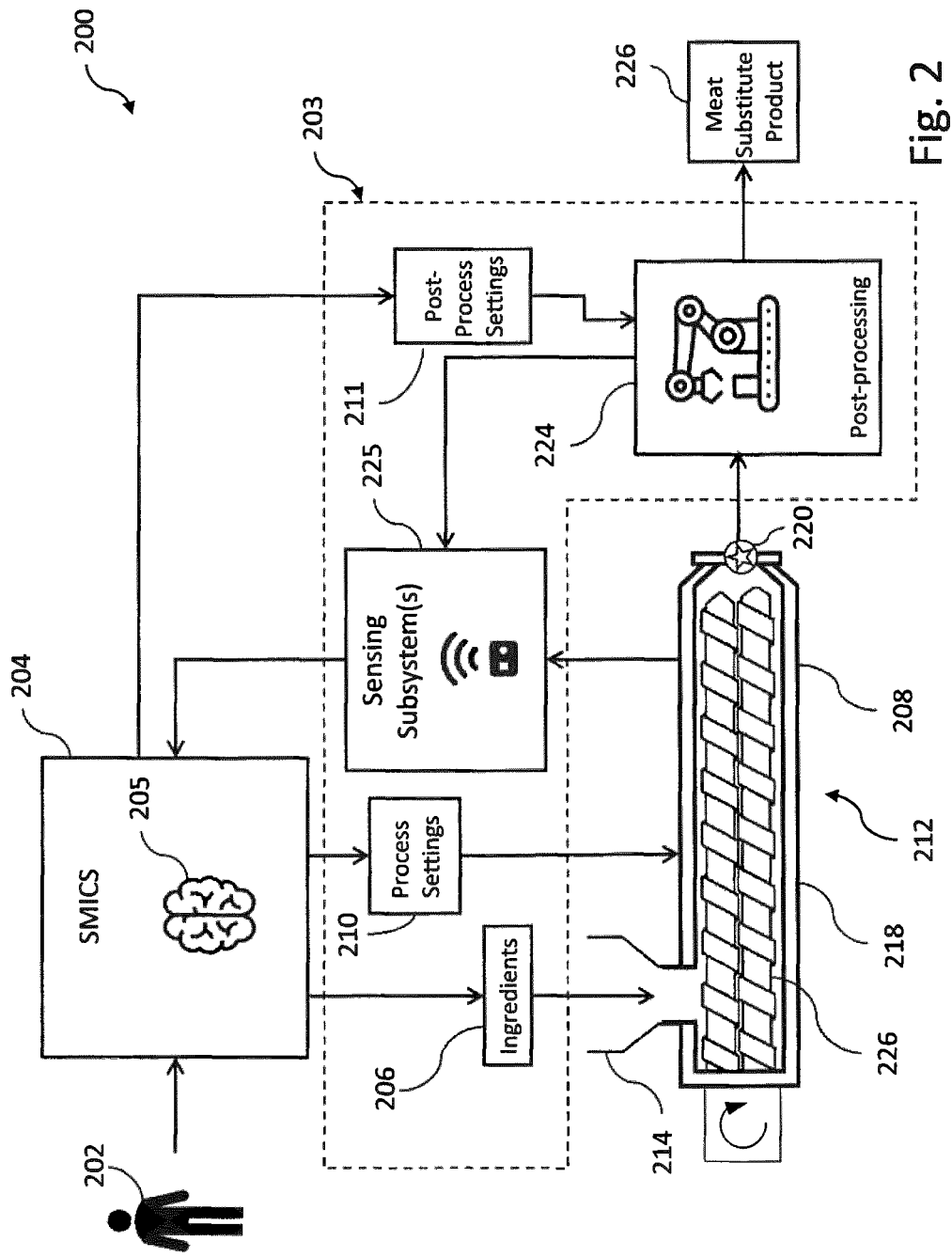
FIG. 2 is a schematic diagram illustrating certain aspects of an example system for producing alternative protein-based meat substitutes.

With reference to FIG. 2, there is illustrated a system 200 for producing an alternative protein-based meat substitute product 226. System 200 includes a wet extrusion process machine 212 which may be the same as or similar to the wet extrusion process machine 112 of system 100. For example, the wet extrusion process machine 212 includes one or more feeders 214 which supply one or more respective ingredients 206 to an extruder 208 which includes one or more rotating screws 216 which are disposed and rotatable within a stationary barrel or chamber 218 defining a length of a processing path. The ingredients 206 may include, for example, one or more alternative protein powders (for example, plant-based flours and/or insect-based flours), water, and oil, and may also include additives, fillers, processing aids, and the like.

The wet extrusion process machine 212 is one example of a wet extrusion process machine configured to receive, mix, and convey a plurality of ingredients to an extrusion die 220, the plurality of ingredients including a protein powder, an oil, and water (including water in liquid, vapor, or solid-phase). For example, the one or more feeders 214 introduce the ingredients 206 into the extruder 208 at various locations along the length of the processing path. In certain embodiments, the one or more feeders 214 may include one or more powder feeder configured to introduce the protein powder to the extrusion passage, one or more water feeders configured to add the water to the extrusion passage, and one or more oil feeders configured to add the oil to the extrusion passage.

The extruder 208 mixes and advances the ingredients 206 along the length of the processing path. One or more heating systems and/or cooling systems may be coupled with the screw extruder and configured to selectably heat or cool one or more locations along the length of the extrusion passage effective to control the process temperature at different locations along the length of the processing path, and extrudes a processed mixture through the extrusion die 220. It shall be appreciated that the wet extrusion process machine 212 is one but one example of a wet extrusion machine configured to receive, mix, and convey a plurality of ingredients to an extrusion die and that a number of alternatives and variations are contemplated as will occur to one of skill in the art with the benefit of the present disclosure. It shall be further appreciated that a variety of wet extrusion machines and wet extrusion processes may be utilized in embodiments according to the present disclosure.

A number of embodiments according to the present disclosure comprise various types of macro-scale wet extrusion machines and processes, for example, single-screw extruders, twin-screw extruders, higher-order multi-screw extruders, kneaders, kneading-extruders, counter-rotating extruders, co-rotating extruders, and other types of macro-scale extruder machines and processes. Additionally or alternatively, the wet extrusion machines and processes may comprise micro-scale extrusion, for example, via filament deposition, fused filament fabrication, fused filament modeling, or other 3D printing or micro-scale material extrusion techniques.

Wet extrusion machines and processes according to the present disclosure may respectively perform and comprise a number of acts. Such acts may include blending or mixing one or more dry ingredients and one or more liquid ingredients to form a blend or mixture (sometimes referred to as a dough), processing the dough to denature proteins and orient protein fibers, and fixation or setting of a fibrous structure. Processing the dough to denature proteins and orient protein fibers may comprise application of mechanical force to the dough, for example, by agitating, beating, confluence flowing, friction application, impingement, kneading, pressurizing, shaking, spinning, turbulence application, wave application, or combinations of these and/or other applications of mechanical force. Processing the dough to denature proteins and orient protein fibers may additionally or alternatively be performed by application of chemical reagents, radiant energy, electromagnetic energy, and/or thermal energy. The chemical reagents may include pH adjusting agents, kosmotropic agents, chaotropic agents, gypsum, salts, surfactants, emulsifiers, fatty acids, amino acids, enzymes, or combinations of these and/or other chemical components. Fixation or setting of a fibrous structure may comprise applying temperature changes, pressure changes, dehydration, redox reactions, chemical fixation, and/or other fixation operations.

System 200 further includes an electronic process control system (EPCS) 203 which is one example of an EPCS configured to control a wet extrusion machine using a plurality of process settings effective to produce an extrusion die mixture which is forced into, passes through, and is output from the extrusion die. For example, the EPCS 203 is configured to control the wet extrusion machine 212 using a plurality of process settings 210 effective to produce an extrusion die mixture which is forced into, passes through, and is output from the extrusion die 220. The process settings 110 may include quantities or rates of introduction of the ingredients 206, rotation speed of the one or more screws 216, temperature settings at one or more locations along the length of the processing path, pressure settings at one or more locations along the length of the processing path, and other operational settings of wet extrusion process machine 212.

The EPCS is further configured to control automated post-processing equipment 224 using a plurality of post-process settings 211. The automated post-processing equipment 224 is configured to further process the die mixture which output from the extrusion die 220 into the final form of a meat substitute product 226, for example, by cutting, shredding, tearing, ripping, rolling or other post-processing techniques.

The EPCS further includes one or more sensing subsystems 225 which sense and provide feedback parameters to a supervisory machine intelligence control system (SMICS). The feedback parameters may include parameters from sensors associated with the wet extrusion machine 212 and/or the automated post-processing equipment 224. The sensors may be configured to sense and provide feedback parameters associated with operation of and/or the material being processed by the wet extrusion machine 212 and/or automated post-processing equipment 224. In certain forms, sensing subsystems 225 may include one or more of the sensing subsystems and/or sensors described below in connection with FIG. 3, a combination of two or more of the sensing subsystems and/or sensors described below in connection with FIG. 3, and, additionally or alternatively, other forms and types of sensing subsystems and/or sensors.

The system 200 relies on one or more machine intelligence components of the SMICS 204 to determine, provide, and adjust or modify the ingredients 206, process settings 210, post-process setting 211 utilized by EPCS 203 in order to achieve the desired characteristics of the meat substitute product 226. The ingredient settings 206 provided by SMICS 204 to EPCS 203 may include quantitative and qualitative ingredient specifications for a plurality of ingredients, for example, one or more alternative protein powders (for example, plant-based flours, proteins derived from microorganism fermentation, and/or insect-based flours), water, and oil, and may also include additives, fillers, processing aids, and the like.

The process settings 210 provided by SMICS 204 to EPCS 203 may include quantities or rates of introduction of the ingredients 206, rotation speed of the one or more screws 216, temperature, pressure, and/or humidity settings at one or more locations along the length of the processing path, and other operational settings of wet extrusion process machine 212. The post-process settings 211 provided by SMICS 204 to EPCS 203 may include force, magnitude, frequency, and other control parameters associated with cutting, shredding, tearing, ripping, rolling or other post-processing techniques may be performed by automated post-processing equipment 224.

A human operator 202 can provide input such as available ingredients and desired product data to SMICS 204, although it is also contemplated that such inputs may be provided in an automated, or semi-automated manner. The desired product data input may include a number of parameters associated with a desired intermediate or final product, including, for example, digital images of known mixtures at or proximate the input of an extrusion die comparable to extrusion die 220, at or proximate the output of an extrusion die comparable to extrusion die 220 or at one or more additional or alternate locations relative to such an extrusion die. The desired product data input may additionally or alternatively include a number of physical fibrosity parameters determined by processing digital images of such known mixtures, including, for example, physical fibrosity parameters such as a fiber size metric, a fiber orientation metric, a fiber alignment metric, a fiber entanglement metric, inter-fiber distance metric, a torsion force metric, a density metric, a fiber bubble metric or combinations thereof.

It shall be appreciated that the aforementioned physical fibrosity parameters may be defined in a number of manners. For example, the fiber size metric may include one or more of an average fiber diameter, an average fiber length, a fiber diameter distribution or variance, a fiber length distribution or variance, a quartile, quintile, decile, or other range metrics of fiber diameter and/or length or various other size metrics as would occur to one of skill in the art with the benefit of the present disclosure. The fiber orientation metric may include, for example, an orientation uniformity index ranging from 0 (indicating a group of fibers with a random or pseudo-random orientation relative to an orientation reference) to 1 (indicating a group of fibers with orientations that are substantially or completely uniform relative to the orientation reference). The fiber alignment metric may include, for example, an orientation uniformity index ranging from 0 (indicating a group of fibers with random or pseudo-random alignments relative to one another) to 1 (indicating a group of fibers with alignments that are substantially or completely uniform relative to one another). The fiber entanglement metric may include, for example, a number of fiber crossings per unit area of a digital image. The inter-fiber distance metric may include an average distance between adjacent fibers. The density metric may be calculated or derived using one or more of the foregoing metrics, for example, using a ratio of fiber to inter-fiber distance, and one or more coefficients corresponding to a fiber size metric, a fiber orientation metric, a fiber alignment metric, a fiber entanglement metric, and/or a fiber bubble metric. It shall be further appreciated that the aforementioned averages may include mean averages, median averages, mode averages, weighted averages, or variations thereof. A fiber bubble metric may indicate the presence, degree, and characteristics of air or gas bubble formation within the fibers or in the inter-fiber matrix, for example, a bubble count per unit area or unit volume, and average bubble size (e.g., diameter, radius, volume, etc.), and/or a bubble frequency. It shall be appreciated that for some purposes, the fiber bubble metric may be considered a form of or may be correlated with a fiber density metric.

In general, the SMICS 204 is structured to perform certain operations and to receive and interpret signals from any component and/or sensor of the system 200 with which it is in operative communication, either directly or indirectly. It shall be appreciated that the SMICS 204 may be provided in a variety of forms and configurations including one or more computing devices forming a whole or a part of a processing subsystem having non-transitory memory storing computer-executable instructions, processing, and communication hardware. The SMICS 204 may be a single device or a distributed device, and the functions of the SMICS 204 may be performed by hardware or software. The SMICS 204 is in communication with any actuators, sensors, datalinks, computing devices, wireless connections, or other devices to be able to perform any described operations. The SMICS 204 may include one or more non-transitory memory devices configured to store instructions in memory which are readable and executable by the SMICS 204 to control operation of system 200 as described herein.

Certain operations described herein include operations to determine one or more described parameters. SMICS 204 may be configured to determine and may perform acts of determining in a number of manners, for example, by calculating or computing a value, using statistical techniques, obtaining a value from a lookup table or using a lookup operation, receiving values from a datalink or network communication, receiving an electronic signal indicative of the value, receiving a parameter indicative of the value, reading the value from a memory location on a computer-readable medium, receiving the value as a run-time parameter, and/or by receiving a value by which the interpreted parameter can be calculated, and/or by referencing a default value that is interpreted to be the parameter value.

The SMICS 204 includes one or more machine intelligence components 205 which may be configured to perform a number of machine intelligence techniques to automatically adjust or modify the ingredients 206, process settings 210, post-process setting 211 utilized by EPCS 203 in response to feedback information from the one or more sensing subsystems 225. For example, the machine intelligence component 205 may be configured to utilize a machine learning technique such as one or more of the techniques described herein.

The SMICS 204 may utilize a deep learning or deep structured learning technique in which the one or more machine intelligence components 205 utilize an artificial neural network (ANN) with multiple layers between the input layer and the output layer. For example, the ANN may be configured with a multi-layer credit assignment path (CAP) which defines the neural network chain of transformations from the input layer to the output layer.

The SMICS 204 may utilize a supervised or semi-supervised learning technique in which the one or more machine intelligence components 205 are provided with example inputs and their desired outputs, and a defined goal of generating one or more rules that map inputs to outputs. The example inputs, desired outputs, and defined goal may be input by a user and/or at least in part acquired by the one or more machine intelligence components 205 during operation of the system 200.

The SMICS 204 may utilize a reinforcement learning technique in which the one or more machine intelligence components 205 interacts with a dynamic process environment over time in which it must perform a defined goal, for example, producing or duplicating desired product data input to SMICS 204. In such embodiment, as the one or more machine intelligence components 205 repeatedly navigates a problem space, it is provided with feedback from sensing subsystems and/or an operator or trainer which is utilized as a reward that the one or more machine intelligence components 205 seeks to maximizes.

In other embodiments, the SMICS 204 may additionally or alternatively utilize other machine learning techniques such as unsupervised learning wherein no labels are given to the one or more machine intelligence components 205, leaving them on their own to find structure in its input. Further embodiments may utilize other machine learning techniques such as topic modeling, dimensionality reduction, or meta learning.

As further described herein, the SMICS 204 may utilize the foregoing machine learning techniques in a learning or training mode wherein the SMICS 204 generates, maintains, and/or updates one or more models to establish a correlation between one or more of the process feedback inputs disclosed herein and one or more of the process control parameters or settings disclosed herein. The SMICS 204 may additionally or alternatively utilize the foregoing machine learning techniques in a control or supervisory mode to control the aesthetic characteristics of a produced meat substitute product. The SMICS 204 may additionally or alternatively utilize the foregoing machine learning techniques in a product development mode to identify and characterize recipes for a produced meat substitute product including ingredient parameters and process setting parameters.

Figure 3:
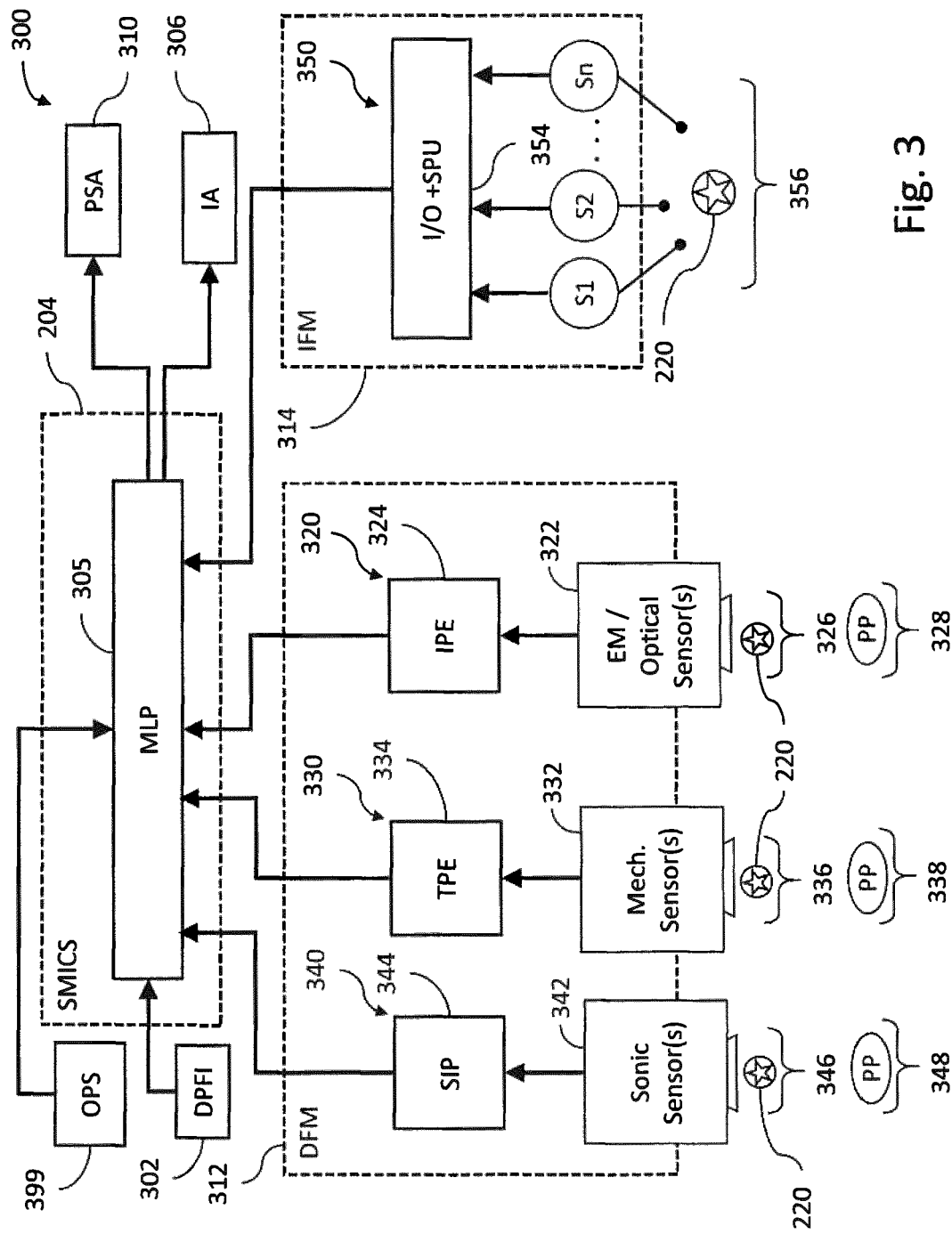
FIG. 3 is a schematic diagram illustrating certain aspects of an example implementation of a system for producing alternative protein-based meat substitutes such as the system of FIG. 2.

With reference to FIG. 3, there is illustrated a schematic diagram depicting certain aspects of an example implementation 300 of the system 200 including certain aspects of the sensing subsystems 225 and the SMICS 204. The implementation 300 includes a direct fibrosity measurement (DFM) subsystem 312 and an indirect fibrosity measurement (IFM) subsystem 314 which are operatively coupled with the SMICS 204. In the implementation 300, the machine intelligence component 205 of SMICS 204 is configured to implement a machine learning process (MLP) 305 which may be configured to utilize one or more of the machine learning techniques described above in connection with FIG. 2. The DFM subsystem 312 and IFM subsystem 314 are each configured to provide one or more inputs to the MLP 305. It shall be appreciated that some embodiments may include only one of the DFM subsystem 312 and IFM subsystem 314. Additionally, some embodiments may include multiple instances of either or both of a DFM subsystem and an IFM subsystem which may be configured to provide one or more inputs to the MLP 305.

The DFM subsystem 312 is configured to directly measure one or more physical fibrosity parameters of the extrusion die mixture. To this end, the DFM subsystem may include one or more of an optical or other electromagnetic spectrum range sensor system (EM/optical sensor system 320), a mechanical force sensor system 330, and a sonic sensor system 340. It shall be appreciated that some embodiments may include only one of the foregoing sensor systems, while some embodiments may include two or more of the foregoing sensor systems. Additionally, some embodiments may include multiple instances of any one or more of the foregoing sensor systems.

The EM/optical sensor system 320 includes one or more optical or other electromagnetic spectrum sensors (EM/optical sensors) 322 configured to provide digital images of the extrusion die mixture. It shall be appreciated that EM/optical sensor system 320 and its constituent EM/optical sensors 322 may comprise a number of sensor types. In some forms, the EM/optical sensor system 320 and its constituent EM/optical sensors 322 may comprise cameras or other optical sensors adapted to the visible light spectrum, ultraviolet light spectrum, infrared light spectrum, or combinations thereof. In some forms, the EM/optical sensor system 320 and its constituent EM/optical sensors 322 may comprise or utilize light diffusion sensing systems and sensors adapted to sense directional diffusion of light from a surface. One or more of the EM/optical sensors 332 may also be used in combination with spectral filters, polarization filters, and other types of filters. The use of either or both of incoherent optical sensors and systems and coherent sensors and systems (e.g., laser sensors and system) is further contemplated. The use of either or both of monochrome and color imaging is contemplated, for example, color imaging techniques may be utilized on extrudate leaving an extruder die at a point downstream of the die to infer fiber structure in the bulk (fiber orientation, fiber length, and other fiber features such as patterns, fiber bubble metrics, and the other fibrosity metrics disclosed herein).

The EM/optical sensor system 320 and its constituent EM/optical sensors 322 may comprise or utilize multispectral or hyperspectral sensor or imaging systems such as spatial scanning systems and sensors, spectral scanning systems and sensors, snapshot imaging systems and sensors, spatio-spectral scanning systems and sensors, and/or other types of systems and sensors adapted to sample multiple spectra per unit area such as by sensing of a hyperspectral cube or other multi-dimensional spatio-spectral constructs. EM/optical sensor system 320 and its constituent EM/optical sensors 322 may additionally or alternatively comprise systems and sensors adapted to operate in non-optical ranges of the electromagnetic spectrum. In some forms, EM/optical sensor system 320 and its constituent EM/optical sensors 322 may comprise electromagnetic tomography systems and sensors, X-ray systems and sensors, nuclear magnetic resonance systems and sensors, and/or additional types of non-optical spectrum EM/optical sensors and systems.

It shall be further appreciated that digital images of the extrusion die mixture provided by the EM/optical sensor system 320 and its constituent EM/optical sensors 322 may comprise a number of forms corresponding to the different forms of the EM/optical sensor system 320 and its constituent EM/optical sensors 322 contemplated herein, including, for example, conventional digital image matrices or arrays, spectral data, and other data structures.

In forms including one or more sensors adapted to the optical spectrum, such sensors may comprise a charge-coupled device (CCD) array, a complementary metal-oxide-semiconductor CMOS array, and/or other types optical sensors arrays, devices, and elements. The one or more EM/optical sensors 332 may be configured with one or more lens systems configured to capture macroscopic images, microscopic images, instances of both, or combinations of both. As described above, the one or more EM/optical sensors 322 may be provided in forms configured to detect light in the visible spectrum, infrared spectrum, and/or ultraviolet spectrum. The optical sensor system 320 also includes image processing electronics 324 which is configured to process raw data from the one or more EM/optical sensors 322 into the form of digital images which are provided to MLP 305 of SMICS 204.

The one or more EM/optical sensors 322 may be positioned and configured to capture images of the extrusion die mixture at an extrusion die location range 326. The extrusion die location range 326 may be located in the range extending from a location at or proximate the inlet of the extrusion die 220 to a location at or proximate the outlet of the extrusion die 220. Additionally or alternatively one or more EM/optical sensors 322 may be positioned and configured to capture images of the extrusion die mixture at a post-processing location range 338 which may be any accessible point or location of automated post-processing equipment 224. In such instances, time stamping and time adjustment techniques such as those disclosed herein may be utilized to provide a time adjusted correlation of the measurement location with the extrusion die location allowing measurements at downstream locations to be correlated with conditions at the time the measured material passed through the extrusion die 220.

Depending on the process location(s) at which measurements or readings of the one or more EM/optical sensors 322, time stamping and/or time adaptation techniques may be utilized to temporally correlate the measurements or readings of the one or more EM/optical sensors 322 with other sensor measurements or readings or other process parameters. For example, where one or more measurements or readings are taken by EM/optical sensors 322 at a post-processing location, such as a point or location of automated post-processing equipment 224, time stamping and/or time adaptation techniques may be utilized to determine a point in time at which the material subject to the sensor measurements or readings was at an earlier production process point or location. As noted above, such techniques may be utilized, for example, to correlate one or more measurements or readings are taken by EM/optical sensors 322 with other process measurements such as temperature or moisture at a different process location, such as at or proximate the outlet of the extrusion die 220. Such time stamping and/or time adaptation techniques may account for variation in process rates over time. The same or substantially similar time stamping, and alignment techniques may additionally or alternatively be utilized in connection with the other sensor systems and sensors disclosed herein including, for example, the mechanical force sensor system 330 including one or more mechanical force sensors 332 and/or the sonic sensor system 340 including one or more sonic sensors 342.

Some forms contemplate the use of computer-based estimators, observers, soft sensors in addition to one or more physical EM/optical sensors 322. Such computer-based estimators, observers, soft sensors may additionally or alternatively be utilized in connection with the other sensor systems and sensors disclosed herein including, for example, the mechanical force sensor system 330 including one or more mechanical force sensors 332 and/or the sonic sensor system 340 including one or more sonic sensors 342.

The mechanical force sensor system 330 includes one or more mechanical force sensors 332 which may include strain gauges, force transducers, piezoelectric sensors, piezoresistive sensors, capacitive sensors, elastoresistive sensors, elastography sensors and/or other types of sensors elements configured to sense mechanical force. The one or more mechanical force sensors 332 may be configured to measure one or more tensile metrics (for example, tensile strength, dynamic tensile resistance behavior, pulling force, or another tensile force metric), compression metrics (for example, simulated biting force via a tooth emulating sensor arrangement, simulated tactile force via a soft tissue emulating sensor arrangement, compressive force to one or more displacement or deformation criteria, compressive force to failure, or another compression force metric), and/or a metric correlated with mechanical force (for example a density metric) of the extrusion die mixture. The one or more mechanical force sensors 332 may comprise one or more elastographic sensor systems or sensors configured for actively mechanically exciting a material under evaluation and dynamically evaluating a sensed response.

One or more of the mechanical force sensor 332 may be positioned and configured to selectably contact the extrusion die mixture at an extrusion die location range 336. The extrusion die location range 336 may be located in the range extending from a location at or proximate the inlet of the extrusion die 220 to a location at or proximate the outlet of the extrusion die 220. Additionally or alternatively one or more sensor elements of the mechanical force sensor 332 may be positioned and configured to selectably contact the extrusion die mixture at a post-processing location range 338 which may be any accessible point or location of automated post-processing equipment 224. It shall be appreciated that, depending on the particulars of the extrusion machine and extrusion die used in a given embodiment, a proximate location may be considered a location within 10 cm or less, a location within 5 cm or less, or a location within 1 cm or less.

The sonic sensor system 340 includes one or more sonic sensors 342 which may comprise ultrasound transmitter and receiver or transceiver components such as used in ultrasound imaging systems. The one or more sonic sensors 342 may be configured with one or more acoustic waveguide structures to direct sound waves to a measurement target and collect sound waves reflected by a measurement target. The sonic sensor system 240 also includes a sonic image processing electronics 324 which processes the raw data received from the one or more sonic sensors 342 into the form of digital images which are provided to MLP 305 of SMICS 204.

The one or more sonic sensors 342 may be positioned and configured to direct sound to and detect reflected sound from the extrusion die mixture at an extrusion die location range 346. The extrusion die location range 346 may be located in the range extending from a location at or proximate the inlet of the extrusion die 220 to a location at or proximate the outlet of the extrusion die 220. Additionally or alternatively one or more sonic sensors 342 may be positioned and configured to direct sound to and detect reflected sound from the extrusion die mixture at a post-processing location range 338 which may be any accessible point or location of automated post-processing equipment 224.

The IFM subsystem 314 includes one or more sensors (for example, sensors S1, S2, . . . Sn) configured to measure one or more extrusion process parameters. The extrusion process parameters may preferably include one or more of a flow rate of the extrusion die mixture, a flow pressure of the extrusion die mixture, a temperature of the extrusion die mixture, and a moisture content or characteristic of the extrusion die mixture. The extrusion process parameters may additionally or alternatively include higher-order indicators of such extrusion process parameters. One or more motor operating parameter (e.g., motor torque, power consumption, motor currents, and motor voltages) may be correlated with one or more of the foregoing extrusion process parameters, for example, the flow rate or flow pressure of the extrusion die mixture. Pressures and temperatures at one or more locations of the extruder, thermal power loading of one or more temperature control loops, temperature of the cooling die, flowrate and/or temperature change of the cooling fluid in the cooling die heat exchanger, may be correlated with one or more of the foregoing extrusion process parameters, for example, the temperature of the extrusion die mixture. Measurements from the extruder feed including water and oil flow rates as well as the feed rate of the dry feedstock may be correlated with one or more of the foregoing extrusion process parameters, for example, the flow rate of the extrusion die mixture or the moisture content or characteristic of the extrusion die mixture. Measurements of the moisture content of the dry feedstock and/or moisture measurements of the mixture along the processing line may be correlated with one or more of the foregoing extrusion process parameters, for example, the moisture content or characteristic of the extrusion die mixture. Additional online or offline obtained measurements related to the product features such as an analysis indicating the degree of protein denaturation and cross-linking or an analysis of the viscoelastic behavior may also be correlated with one or more of the foregoing extrusion process parameters.

The one or more sensors may be positioned and configured to measure one or more extrusion process parameters at an extrusion die location range 356. The extrusion die location range 356 may be located in the range extending from a location at or proximate the inlet of the extrusion die 220 to a location at or proximate the outlet of the extrusion die 220. Additionally or alternatively one or more sensors may be positioned and configured to provide sensor readings from any accessible point or location of automated post-processing equipment 224. The IFM subsystem 314 also includes an input/output (I/O) and signal processing unit 250 which conditions and processes the raw data received from the one or more sensors into a form suitable for use as input to MLP 305 of SMICS 204.

It shall be appreciated that the SMICS 204 is one example of a supervisory machine intelligence control system operatively coupled with at least one of a direct fibrosity measurement (DFM) subsystem configured to directly measure one or more physical fibrosity parameters of the extrusion die mixture, and an indirect fibrosity measurement (IFM) subsystem configured to measure one or more process parameters associated with the extrusion die mixture, and which is configured to modify one or more of the plurality process settings in response to at least one of the one or more physical fibrosity parameters, and the one or more process parameters, effective to modify the extrusion die mixture and the resulting meats substitute product 226 produced therefrom.

In the example implementation 300, the MLP 305 is configured to determine one or more process settings adjustments or modifications (PSA) 310 and/or one or more ingredient adjustments or modifications (IA) 306 in response to at least one of the one or more physical fibrosity parameters received from the DFM subsystem 312, and the one or more extrusion process parameters received from the IFM subsystem 314. The PSA 310 and/or IA 306 are provided to and utilized by the EPCS 203 in performing control operations and are effective to modify the physical and aesthetic characteristic extrusion die mixture and the resulting meats substitute product 226 produced therefrom. For example, PSA 310 and/or IA 306 may be used by the EPCS to adjust or modify the ingredients 206, process settings 210, and/or post-process settings 211.

The MLP 305 is one example of a process implemented by a SMICS component to receive a desired product data input from an operator, receive feedback input from at least one of the DFM subsystem and the IFM subsystem, execute a machine-learning algorithm or process to identify one or more control relationships between one or more of the plurality process settings and the desired product data input, and utilize the one or more control relationships to modify one or more of the plurality process settings.

As described above, the MLP 305 receives feedback inputs from one of both of DFM subsystem 312 and IFM subsystem 314. The feedback inputs received from the DFM subsystem 312 may include digital images of the extrusion die mixture. The MLP 305 may utilize and treat the digital images themselves as at least one of the physical fibrosity parameters. Additionally, or alternatively, the MLP 305 or another processing component of the SMICS may be configured to further process the digital images to determine one or more of the physical fibrosity parameters from the images of the extrusion die mixture. Such further processing of the images of the extrusion die mixture to determine physical fibrosity parameters may include processing to determine one or more of a fiber size metric, a fiber orientation metric, a fiber alignment metric, a fiber entanglement metric, an inter-fiber distance metric, a torsion force metric, a density metric which (which may be may be calculated or derived from one or more of the foregoing metrics), and a metric indicating the presence, degree, and characteristics of air or gas bubble formation within the fibers or in the inter-fiber matrix, for example, a bubble count per unit area or unit volume, and average bubble size (e.g., diameter, radius, volume, etc.), and/or a bubble frequency. Such metrics may be defined, for example, in accordance with the examples described in connection with FIG. 2

The MLP 305 may also receive feedback inputs from other process sensors (OPS) 399 which may be, for example, ingredient moisture or humidity sensors, ingredient feed rate sensors, process flow rate sensors, process flow pressure sensors, process temperature sensors, process humidity or moisture sensors, and other types of sensors provided to measure other aspects of the process performed by system 200. The MLP 305 may utilize the inputs from the DFM subsystem 312 and/or the IFM subsystem 314 as well as the inputs from OPS 399 in its machine learning process. In certain embodiments, the inputs from DFM subsystem 312 and/or IFM subsystem 314 are preferably prioritized or weighted over other inputs to guide or constrain the machine learning process performed by the MLP 305. In certain preferred embodiments, this is believed to advantageously accelerate and improve the efficacy of the machine learning process performed by MLP 305.

The MLP 305 may utilize a combination of the inputs from the DFM subsystem 312 and/or the IFM subsystem 314 as well as a variety of inputs from OPS 399. The inputs from OPS 399 may include motor operating parameters (e.g., motor torque, power consumption, motor currents, and motor voltages), pressure and temperature measurements from different locations of the extruder, thermal power loading of the temperature control loops, temperature measurements from the cooling die, flowrate and temperature change of the cooling fluid in the cooling die heat exchanger, measurements from the extruder feed including water and oil flow rates as well as the feed rate of the dry feedstock and when available an indication of the moisture content of the dry feedstock, moisture measurements of the mixture along the processing line, online or offline obtained measurements related to the product features such as an analysis indicating the degree of protein denaturation and cross-linking or an analysis of the viscoelastic behavior, and/or other inputs from OPS 399.

The MLP 305 may be utilized to generate, maintain, and update control models or other control components for a number of purposes. In certain embodiments, the control models or other control components associated with MLP 305 may detect deviations and abnormalities in the operating state of the process from a nominal operating state, establish a root cause for detected deviations and abnormalities, provide control actions to return the process to the nominal operating state (either executing directly or suggestion to an operator, determine a new operating state, which is more desirable than the current operating state based on criteria including but not limited to a higher production rate, improved product quality, improved operational stability, and provide control actions to transition the operating state from one state to another state while satisfying conditions including, for example, a minimum time for transition or a minimum amount of off-spec product.

In certain embodiments, the control models or other control components associated with MLP 305 may utilize mathematical models relating the degree of protein denaturation and cooking/cross-linking to the residence time of the processed mixture and the thermal energy input to the extruder as well as estimated temperature levels within the extruder, utilize mathematical models relating the motor torque and motor power consumption compensated by the feed rate to the viscosity of the processed mixture. In certain embodiments, the control models or other control components associated with MLP 305 may utilize mathematical models relating the degree of fiber orientation, fiber length, or product bulk properties such as the presence of bubbles or molten regions to the rate of protein denaturation and an estimated temperature profile in the die determined based on the rate of cooling and process mixture temperature at the die inlet compensated by the process mixture flowrate. In certain embodiments, the control models or other control components associated with MLP 305 may utilize a combined mathematical model that includes one or more of the aforementioned mathematical models and one or more additional models.

Figure 4:
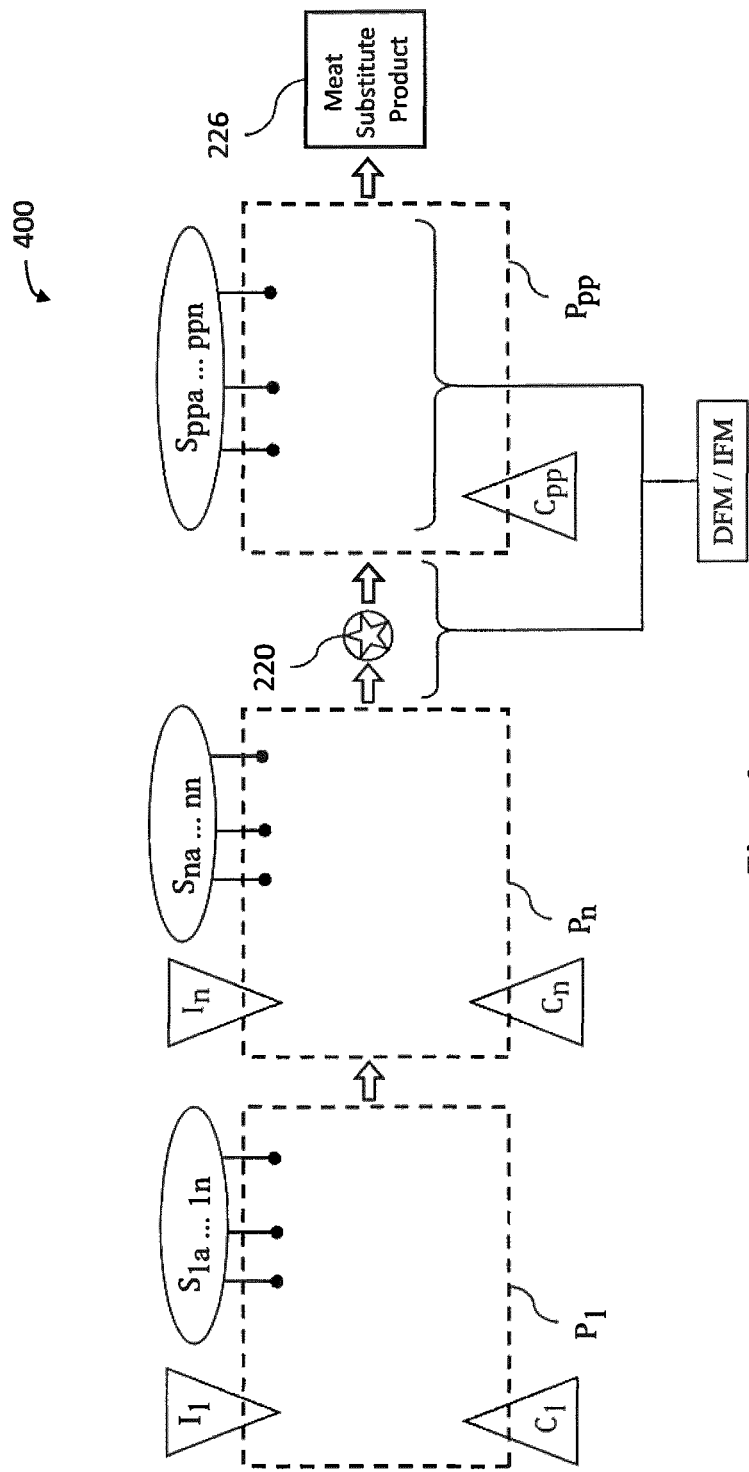
FIG. 4 is a schematic diagram illustrating certain aspects of an example implementation of a system for producing alternative protein-based meat substitutes such as the system of FIG. 2.

With reference to FIG. 4, there is illustrated a schematic diagram depicting certain aspects of an example implementation 400 of the sensing subsystems 225 relative to a plurality of process operations of the system 200. The illustrated process operations of the system 200 include process operations $P_1$ through $P_n$ which are examples of process operations performed with an extrusion process machine (for example, extrusion process machine 212). Process operation $P_1$ involves an ingredient addition 11 (for example, an addition of one or more of the ingredients 206) and is controlled by one or more process control inputs $C_1$ which are determined using one or more process settings (for example, one or more of the process settings 210). Process operation $P_1$ is monitored by one or more sensors $S_{1a} \ldots S_{1n}$ which are examples of process sensors configured to provide other process inputs (for example, OPS inputs 399). The one or more sensors $S_{1a} \ldots S_{1n}$ may be configured to provide continuous sensor outputs or discrete sensor outputs. Similarly, the process control inputs $C_1$ may be determined and provided as continuous control inputs or as discrete control inputs.

Process operation $P_n$ involves an ingredient addition $I_n$ (for example, an addition of one or more of the ingredients 206) and is controlled by one or more process control inputs $C_n$ which may be determined using one or more process settings (for example, an addition of one or more of the process settings 210). Process operation $P_n$ is monitored by one or more sensors $S_{na} \ldots S_{nm}$ which are examples of process sensors configured to provide other process inputs (for example, OPS inputs 399). As indicated by the notation "n" the implementation 400 may further include a plurality of additional process operations which are not illustrated FIG. 4. The one or more sensors $S_{na} \ldots S_{nm}$ may be configured to provide continuous sensor outputs or discrete sensor outputs. Similarly, the process control inputs $C_n$ may be determined and provided as continuous control inputs or as discrete control inputs.

The illustrated process operations of the system 200 include post-processing operations $P_{pp}$ which are examples of process operations performed with automated post-processing equipment (for example, automated post-processing equipment 224). Post-processing operations $P_{pp}$ are controlled by one or more post-processing control inputs $C_{pp}$ which are determined using one or more post-process settings (for example, one or more of the post-process settings 211). Post-process operation $P_{pp}$ is monitored by one or more sensors $S_{ppa} \ldots S_{ppn}$ which are examples of process sensors configured to provide other process inputs (for example, OPS inputs 399). The one or more sensors $S_{ppa} \ldots S_{ppn}$ may be configured to provide continuous sensor outputs or discrete sensor outputs. Similarly, the one or more post-processing control inputs $C_{pp}$ may be determined and provided as continuous control inputs or as discrete control inputs.

The implementation 400 includes one or both of a direct fibrosity measurement (DFM) subsystem and an indirect fibrosity measurement (IFM) subsystem (for example, DFM 312 and/or IFM 314) each or both of which may be configured to measure one or more process operations associated with the extrusion die 220 or post-processing operations Ppp. The DFM and/or IFM subsystems include the attributes and features and may be configured and implemented in accordance with the DFM 312 and/or IFM 314, respectively. Accordingly, it shall be appreciated that implementation 400 is one example of an implementation configured to provide inputs from a DFM and/or an IFM as well as inputs from other process sensors to a machine learning component of a supervisory machine intelligence control system (for example, MLP 305 of SMICS 204).

It shall be appreciated that the system 200, the implementation 300, and/or the implementation 400 may be utilized in performing a number of methods according to the present disclosure. One example method comprises operating the system 200 (according to the implementation 300, the implementation 400, and/or other implementations) to produce a meat substitute product (for example, meat substitute product 226). One example method comprises operating the system 200 (according to the implementation 300, the implementation 400, and/or other implementations) determine a meat substitute product recipe. One example method comprises operating the system 200 (according to the implementation 300, the implementation 400, and/or other implementations) to control or optimize the aesthetic and physical characteristics of a meat substitute product.

Figure 5:
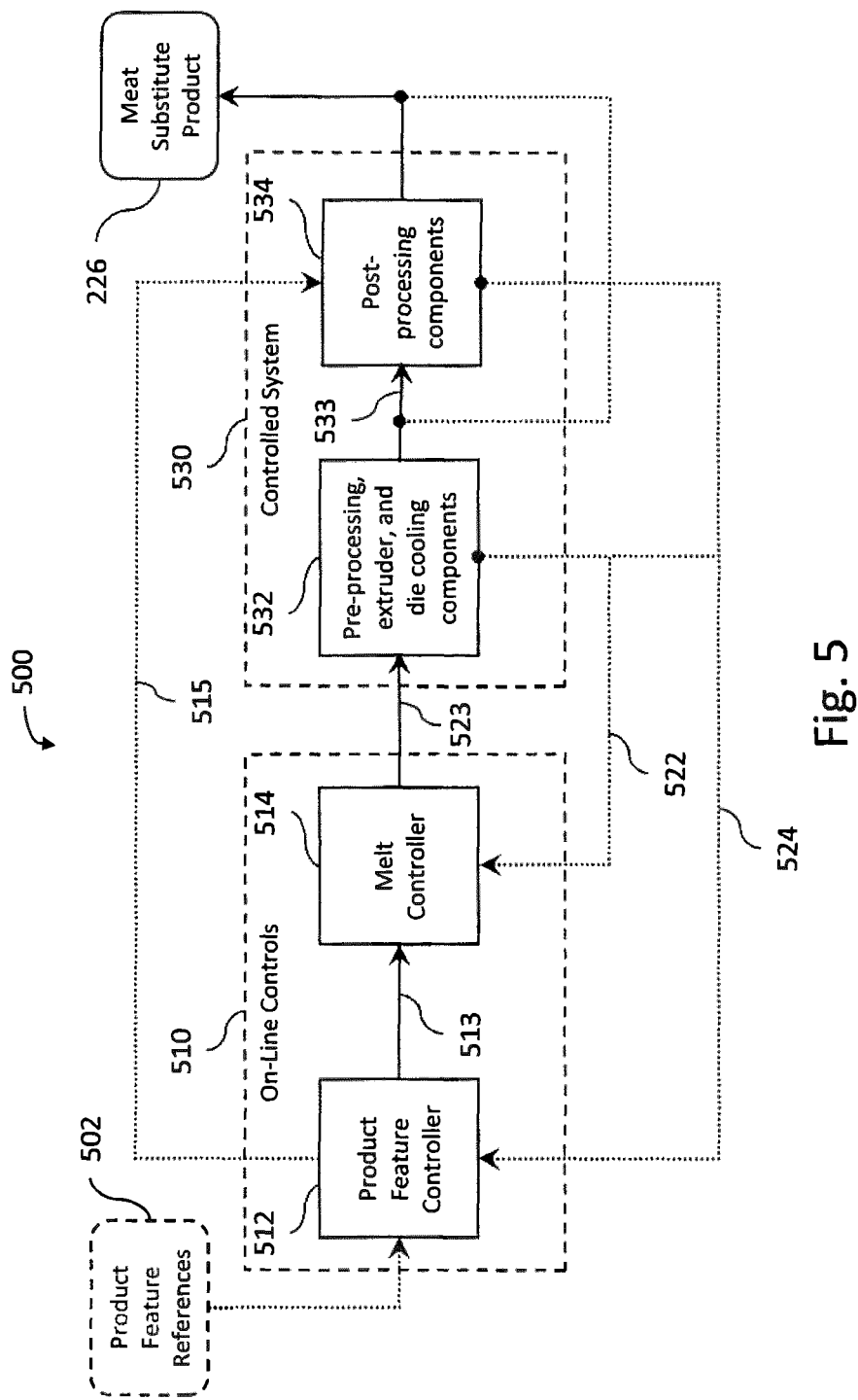
FIG. 5 is a schematic diagram illustrating certain aspects of an example implementation of a system for producing alternative protein-based meat substitutes such as the system of FIG. 2.

With reference to FIG. 5, there is illustrated a schematic diagram depicting certain aspects of an example implementation of a control system 500 which may be implemented or utilized in connection with the system of FIG. 2 or another example system for producing alternative protein-based meat substitutes. The control system 500 includes on-line controls 510 and a controlled system 530. The on-line controls 510 include a product feature controller 512 and a melt controller 514. The on-line controls 510 may comprise some or all of the components of the EPCS 203 or another electronic process control system, and may additionally or alternatively comprise some or all of the components of the SMICS 204 or other supervisory machine intelligence control system. The controlled system 530 includes a material pre-processing, extruder, and extrusion die cooling components 532 (sometimes referred to as components 532), which may comprise some or all of the controllable components of the wet extrusion process machine 212 or another wet process extrusion machine, and post-processing components 534, which may comprise some or all of the components of automated post-processing equipment 224 or other post-processing equipment.

The control system 500 is configured in a hierarchical, multi-layer, closed-loop form comprising an inner feedback loop including the melt controller 514 and the components 532, and an outer feedback loop including the product feature controller 512 and the post-processing components 534. In the inner feedback loop, the melt controller 512 provides process control outputs 523 to the components 532 and process measurement feedbacks 522 are provided from the components 532 to the melt controller 512. In the outer feedback loop, the product feature controller 512 provides melt feature references 513 to the melt controller 512 and provides post-processing references 515 to the post-processing components 534. The product feature controller 512 also receives product features references 502 which may comprise DPFI 302 or other product feature references. The product feature controller 512 also receives product feature measurements pertaining to measurements or sensed characteristics of the extrudate 533 which passes through the components 532 (such measurements or sensed characteristics being possible over a range extending from before an extrudate enters an extrusion die to after the extrudate exits the extrusion die), the post-processed product at one or more points or locations in the post-processing components 534, and/or the ultimate meat substitute product 226.

The melt controller 514 is preferably configured to and operable to regulate rheological features of an extrusion process melt, such as viscosity and elastic strain. Control of such melt features may be useful to provide undisturbed operation of the extruder, as well as the quality and features of the end product. Such melt features may be sensitive to and influenced by a number of potential disturbances and variations in the system, such as varying characteristics of the input protein powder, which arises from unavoidable and often unknown variations in naturally sourced product, or different environmental conditions of material preparation and storage. The melt controller 514 is therefore configured to avoid situations such as clogging of the extruder, poor physical consistency of extrudate, or poor fiber generation.

The melt controller 514 may utilize estimates of melt features obtained from system measurements such as measurements provided by one or more of the sensing subsystems 225 or other sensing systems or components. In some forms, such measurements may be collected exclusively or predominantly at one or more preprocessing steps, at the extruder, and at the beginning of an extrusion die rather than of the post-die extrudate. This technique may be preferred in embodiments wherein an extrusion die comprises a largely passive element (only the overall cooling rate being controllable or regulated) which may introduce significant transportation delay. The process control outputs 523 may comprise commands, variables, or other control parameters for extrusion system actuators, such as extruder screw speed, input flow, and temperature setpoints of the extrusion zones. In some forms, dynamic aperture control of an extrusion die opening is also contemplated.

It is further contemplated that a multivariable control problem and solution methodology may be determined based on dynamic system models of which may be identified by a machine learning component or model and functional relations between process measurements and melt features which may be identified by a machine learning component or model. Such multivariable control problems and solution methodologies may take a number of forms. For example, if the system is weakly coupled, a classical single input single output control with an appropriate compensation mechanism could be utilized. If system variables are strongly coupled methodologies such as linear quadratic regulator or model predictive control can be utilized.

A number of example embodiments shall now be further described. A first example embodiment is a system comprising: a wet extrusion process machine configured to receive, mix, and convey a plurality of ingredients to an extrusion die, the plurality of ingredients including a protein powder, an oil, and water, and an electronic process control system (EPCS) configured to control the wet extrusion machine using a plurality of process settings effective to produce an extrusion die mixture which is forced into, passes through, and is output from the extrusion die. The system comprises a supervisory machine intelligence control system (SMICS) operatively coupled with at least one of a direct fibrosity measurement (DFM) subsystem configured to directly measure one or more physical fibrosity parameters of the extrusion die mixture, and an indirect fibrosity measurement (IFM) subsystem configured to measure one or more extrusion process parameters associated with the extrusion die mixture. The SMICS is configured to modify one or more of the plurality process settings in response to at least one of the one or more physical fibrosity parameters, and the one or more extrusion process parameters.

A second example embodiment is a system comprising the features of the first example embodiment wherein the DFM subsystem comprises one or more of an optical sensor system, a mechanical force sensor system, and a sonic sensor system.

A third example embodiment is a system comprising the features of the second example embodiment wherein the DFM subsystem comprises at least the optical sensor system, and the optical sensor system is configured to generate digital images of the extrusion die mixture and provide the digital images to the SMICS.

A fourth example embodiment is a system comprising the features of the second example embodiment wherein the DFM subsystem comprises at least the sonic sensor system, and the sonic sensor system is configured to generate digital images of the extrusion die mixture and provide the digital images to the SMICS.

A fifth example embodiment is a system comprising the features of the third example embodiment or the fourth example embodiment wherein the SMICS is configured to further process the digital images to determine the physical fibrosity parameters from the images of the extrusion die mixture.

A sixth example embodiment is a system comprising the features of the fifth example embodiment wherein the physical fibrosity parameters comprise one or more of a fiber size metric, a fiber orientation metric, a fiber alignment metric, a fiber entanglement metric, an inter-fiber distance metric, a torsion force metric, and a density, determined from processing the images of the extrusion die mixture.

A seventh example embodiment is a system comprising the features of the third example embodiment or the fourth example embodiment wherein the SMICS is configured to utilize the digital images as at least one of the physical fibrosity parameters.

An eighth example embodiment is a system comprising the features of the second example embodiment wherein the DFM subsystem comprises at least the mechanical force sensor system, wherein the mechanical force sensor system is configured to measure one or more of a tensile force metric, a compression force metric, a torsion force metric, and a density metric of the extrusion die mixture.

A ninth example embodiment is a system comprising the features of the second example embodiment wherein the DFM subsystem comprises two or more of the optical sensor system, the mechanical force sensor system, and the sonic sensor system.

A tenth example embodiment is a system comprising the features of any of the first through ninth example embodiments wherein the IFM subsystem includes one or more sensors configured to measure the one or more extrusion process parameters.

An eleventh example embodiment is a system comprising the features of the tenth example embodiments wherein the one or more extrusion process parameters comprise one or more of a flow rate of the extrusion die mixture, a flow pressure of the extrusion die mixture, a temperature of the extrusion die mixture, and a moisture content or characteristic of the extrusion die mixture.

A twelfth example embodiment is a system comprising the features of any of the first through eleventh example embodiments wherein the SMICS is configured to perform a machine intelligence process, such as machine learning process, including: receiving a desired product data input from an operator, receiving feedback input from at least one of the DFM subsystem and the IFM subsystem, executing a machine learning algorithm to identify one or more control relationships between one or more of the plurality process settings and the desired product data input, and utilizing the one or more control relationships to modify one or more of the plurality process settings. In certain forms of the twelfth example embodiment, other machine decision making, computational engines, or other machine intelligence components may be used in addition to or as alternatives to the machine learning algorithm, for example, one or more of classical control, model predictive control, PID control, multivariable control, optimization-based control.

A thirteenth example embodiment is a system comprising the features of the twelfth example embodiment wherein the machine learning algorithm comprises at least one of a deep learning algorithm, a supervised learning algorithm, and a reinforcement learning algorithm.

A fourteenth example embodiment is a system comprising the features of any of the first through thirteenth example embodiments wherein the wet extrusion machine comprises: at least one motor-driven screw rotatably disposed in an extrusion passage extending along a length; a powder feeder configured to introduce the protein powder to the extrusion passage; a water feeder configured to add the water to the extrusion passage; an oil feeder configured to add the oil to the extrusion passage; and a heating system coupled with the screw extruder and configured to selectably heat one or more locations along the length of the extrusion passage.

A fifteenth example embodiment is a system comprising the features of any of the first through fourteenth example embodiments, wherein one or more components of at least one of the EPCS and the SMICS, comprises a component of a hierarchical, multi-layer, closed-loop control system.

A sixteenth example embodiment is a system comprising the features of the fifteenth example embodiment, wherein the hierarchical, multi-layer, closed-loop control system includes an inner feedback loop including a melt controller and an outer feedback loop including a product feature controller.

A seventeenth example embodiment is a system comprising the features of the sixteenth example embodiment, wherein, in the inner feedback loop, the melt controller provides process control outputs to one or more extrusion system components and receives process measurement feedbacks from one or more sensing systems associate with the extrusion system.

An eighteenth example embodiment is a system comprising the features of any of the first through seventeenth example embodiments wherein, in the outer feedback loop, the product feature controller provides melt feature references to the melt controller, provides post-processing references to one or more post-processing system components.

A nineteenth example embodiment is a system comprising the features of any of the first through eighteenth example embodiments, wherein the SMICS receives inputs from both the DFM subsystem and the IFM subsystem and utilizes this input in a machine learning process which, in certain forms, may comprise one or more of a deep learning algorithm, a supervised learning algorithm, and a reinforcement learning algorithm.

A twentieth example embodiment is a method comprising operating the system of any of the first through nineteenth example embodiments to at least one of producing a meat substitute product, determining a meat substitute product recipe, and controlling aesthetic and physical characteristics of a meat substitute product.

A twenty-first example embodiment is an apparatus comprising a supervisory machine intelligence control system (SMICS) operatively coupled with at least one of a direct fibrosity measurement (DFM) subsystem configured to directly measure one or more physical fibrosity parameters of the extrusion die mixture, and an indirect fibrosity measurement (IFM) subsystem configured to measure one or more extrusion process parameters associated with the extrusion die mixture. The SMICS is configured to modify one or more of the plurality process settings in response to at least one of the one or more physical fibrosity parameters, and the one or more extrusion process parameters.

A twenty-second example embodiment is an apparatus including the features of the twenty-first example embodiment wherein the SMICS is provided in combination with a wet extrusion process machine.

A twenty-third example embodiment is an apparatus including the features of the twenty-second example embodiment wherein the wet extrusion process machine is configured to receive, mix, and convey a plurality of ingredients to an extrusion die, the plurality of ingredients including a protein powder, an oil, and water.

A twenty-fourth example embodiment is an apparatus including the features of any of the twenty-first through twenty-second example embodiments, wherein the SMICS is provided in combination with an electronic process control system (EPCS).

A twenty-fifth example embodiment is an apparatus including the features of the twenty-fourth example embodiment wherein the EPCS is configured to control the wet extrusion machine using a plurality of process settings effective to produce an extrusion die mixture which is forced into, passes through, and is output from the extrusion die.

A twenty-sixth example embodiment is a method comprising operating the apparatus of any of the twenty-first through twenty-fifth example embodiments to at least one of producing a meat substitute product, determining a meat substitute product recipe, and controlling aesthetic and physical characteristics of a meat substitute product.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
   a wet extrusion process machine configured to receive, mix, and convey a plurality of ingredients to an extrusion die, the plurality of ingredients including a protein powder, an oil, and water; and
   an electronic process control system (EPCS) configured to control the wet extrusion machine using a plurality of process settings effective to produce an extrusion die mixture which is forced into, passes through, and is output from the extrusion die;
   wherein the system comprises a supervisory machine intelligence control system (SMICS) operatively coupled with at least one of a direct fibrosity measurement (DFM) subsystem configured to directly measure one or more physical fibrosity parameters of the extrusion die mixture, and an indirect fibrosity measurement (IFM) subsystem configured to measure one or more extrusion process parameters associated with the extrusion die mixture;
   wherein the SMICS is configured to modify one or more of the plurality process settings in response to at least one of the one or more physical fibrosity parameters, and the one or more extrusion process parameters.

2. The system of claim 1 wherein the DFM subsystem comprises one or more of an optical sensor system, a mechanical force sensor system, and a sonic sensor system.

3. The system of claim 2 wherein the DFM subsystem comprises at least the optical sensor system, and the optical sensor system is configured to generate digital images of the extrusion die mixture and provide the digital images to the SMICS.

4. The system of claim 2 wherein the DFM subsystem comprises at least the sonic sensor system, and the sonic sensor system is configured to generate digital images of the extrusion die mixture and provide the digital images to the SMICS.

5. The system of claim 3 wherein the SMICS is configured to further process the digital images to determine the physical fibrosity parameters from the images of the extrusion die mixture.

6. The system of claim 5 wherein the physical fibrosity parameters include one or more of a fiber size metric, a fiber orientation metric, a fiber alignment metric, a fiber entanglement metric, an inter-fiber distance metric, a torsion force metric, and a density, determined from processing the images of the extrusion die mixture.

7. The system of claim 3 wherein the SMICS is configured to utilize the digital images as at least one of the physical fibrosity parameters.

8. The system of claim 2 wherein the DFM subsystem comprises at least the mechanical force sensor system, wherein the mechanical force sensor system is configured to measure one or more of a tensile force metric, a compression force metric, a torsion force metric, and a density metric of the extrusion die mixture.

9. The system of claim 2 wherein the DFM subsystem comprises two or more of the optical sensor system, the mechanical force sensor system, and the sonic sensor system.

10. The system of claim 1, wherein the IFM subsystem includes one or more sensors configured to measure the one or more extrusion process parameters.

11. The system of claim 10 wherein the one or more extrusion process parameters include one or more of a flow rate of the extrusion die mixture, a flow pressure of the extrusion die mixture, a temperature of the extrusion die mixture, and a moisture content or characteristic of the extrusion die mixture.

12. The system of claim 1, wherein the SMICS is configured to perform a machine learning process including:
   receiving a desired product data input from an operator,
   receiving feedback input from at least one of the DFM subsystem and the IFM subsystem,
   executing a machine learning algorithm to identify one or more control relationships between one or more of the plurality process settings and the desired product data input, and
   utilizing the one or more control relationships to modify one or more of the plurality process settings.

13. The system of claim 12 wherein the machine learning algorithm comprises at least one of a deep learning algorithm, a supervised learning algorithm, and a reinforcement learning algorithm.

14. The system of claim 1, wherein the wet extrusion machine comprises:
   at least one motor-driven screw rotatably disposed in an extrusion passage extending along a length, a powder feeder configured to introduce the protein powder to the extrusion passage;

a water feeder configured to add the water to the extrusion passage;

an oil feeder configured to add the oil to the extrusion passage; and a heating system coupled with the screw extruder and configured to selectably heat one or more locations along the length of the extrusion passage.

15. A method comprising:

operating a system having:

a wet extrusion process machine configured to receive, mix, and convey a plurality of ingredients to an extrusion die, the plurality of ingredients including a protein powder, an oil, and water;

an electronic process control system (EPCS) configured to control the wet extrusion machine using a plurality of process settings effective to produce an extrusion die mixture which is forced into passes through, and is output from the extrusion die;

wherein the system comprises a supervisory machine intelligence control system (SMICS) operatively coupled with at least one of a direct fibrosity measurement (DFM) subsystem configured to directly measure one or more physical fibrosity parameters of the extrusion die mixture, and an indirect fibrosity measurement (IFM) subsystem configured to measure one or more extrusion process parameters associated with the extrusion die mixture;

wherein the SMICS is configured to modify one or more of the plurality process settings in response to at least one of the one or more physical fibrosity parameters, and the one or more extrusion process parameters; and the method including at least one of producing a meat substitute product, determining a meat substitute product recipe, and controlling aesthetic and physical characteristics of a meat substitute product.

* * * * *